(12) United States Patent
Brown, Jr.

(10) Patent No.: US 9,477,674 B2
(45) Date of Patent: Oct. 25, 2016

(54) MERGING AND SPLITTING OF MEDIA COMPOSITION FILES

(71) Applicant: Avid Technology, Inc., Burlington, MA (US)

(72) Inventor: Robert M. Brown, Jr., Sunnyvale, CA (US)

(73) Assignee: Avid Technology, Inc., Burlington, MA (US)

( * ) Notice: Subject to any disclaimer, the term of this patent is extended or adjusted under 35 U.S.C. 154(b) by 437 days.

(21) Appl. No.: 14/184,836

(22) Filed: Feb. 20, 2014

(65) Prior Publication Data

US 2015/0234850 A1 Aug. 20, 2015

(51) Int. Cl.
*G06F 17/30* (2006.01)

(52) U.S. Cl.
CPC .............. *G06F 17/30126* (2013.01)

(58) Field of Classification Search
CPC ............ G06F 17/30064; G06F 17/30749; G06F 17/30846; G06F 17/30126
USPC ......................................... 707/805
See application file for complete search history.

(56) References Cited

U.S. PATENT DOCUMENTS

| | | | | |
|---|---|---|---|---|
| 5,781,188 A | * | 7/1998 | Amiot | G11B 19/022 715/202 |
| 6,544,293 B1 | * | 4/2003 | Ohanian | G11B 27/034 715/203 |
| 6,571,255 B1 | * | 5/2003 | Gonsalves | G11B 27/034 |
| 8,331,767 B2 | * | 12/2012 | Singh | G11B 27/11 386/239 |
| 2012/0210221 A1 | * | 8/2012 | Khan | G11B 27/034 715/716 |
| 2012/0301112 A1 | * | 11/2012 | Wallace | G11B 27/031 386/278 |
| 2013/0073964 A1 | * | 3/2013 | Meaney | G11B 27/34 715/716 |
| 2014/0143671 A1 | * | 5/2014 | Kovalick | G06F 3/14 715/723 |

OTHER PUBLICATIONS

Avid Pro tools Reference Guide Version 9.0, Import Sessions Data Dialog, Avid Technology, Inc., Rev. B, Nov. 2011, pp. 338-354.

* cited by examiner

*Primary Examiner* — James Trujillo
*Assistant Examiner* — Jessica N Le
(74) *Attorney, Agent, or Firm* — Oliver Strimpel

(57) ABSTRACT

During the production of a time-based media project, it is often desirable for editors to work with media files or reels of a given size, both in terms of the temporal duration of media represented in each file and the number of tracks in a file. During the course of editing, files may become longer, or incorporate additional tracks, making them cumbersome to handle. A super-file view that displays multiple files simultaneously provides a framework for an editor to rebalance files during the course of media production. A graphical user interface permits users to adjust the content of the various files, including moving tracks among multiple files that comprise a given reel, as well as media between files belonging to different reels.

9 Claims, 6 Drawing Sheets

MERGING AND SPLITTING OF MEDIA COMPOSITION FILES

BACKGROUND

When audio or video editors work on large projects such as feature films, the media composition is built up as a set of files, with each file including a part of the work in progress. Each of the files contains about 20 minutes of material, and when arranged sequentially, they make up the entire length of the media composition. In some cases, several files containing different components of the eventual composition are created for a given temporal span. For example, files containing audio tracks of a composition may be created by an audio editor uses a digital audio workstation. Similarly, files containing video sequences may be created by a video engineer using a non-linear video editing system. As the editing proceeds and media is added or removed, files may deviate significantly from 20 minutes-worth of material. When this occurs, the editor adjusts them back to include about 20 minutes-worth of material, since larger files can be unwieldy and harder to navigate during the editing process. This rebalancing process involves moving material from one file to another. Since the editing tools used to create the audio and video only permit a single file to be open at a time, the rebalancing process is cumbersome and time consuming.

SUMMARY

The methods, systems, and computer program products described herein provide a unified "super-session" view across the multiple files or reels that constitute a media composition that enables intuitive and convenient rebalancing of media files. The interface permits users to select temporal spans of media, as well as specific tracks to be moved from one file to another.

In general, in one aspect, a method of allocating time-based media essence among a set of media essence files that comprise a media composition, each media essence file having a corresponding compositional metadata file, involves: displaying a graphical representation of the set of compositional metadata files, each compositional metadata file of the set of compositional metadata files representing multiple elements of time-based media essence corresponding to a given time span within the media composition, and wherein a temporal relationship among the time spans of the set of media essence files is reflected in a displayed spatial arrangement of the representation of the compositional metadata files; and enabling a user to interact with the displayed graphical representation of the set of compositional metadata files to: change time spans of the set of media essence files by adjusting a graphically represented boundary between a pair of compositional metadata files representing media essence files comprising media essence corresponding to temporally adjacent time spans of the media composition; and change a set of elements within one or more of the media essence files by moving a graphical representation of the set of elements within a first compositional metadata file corresponding to a first time span within the media composition to a second compositional metadata file corresponding the first time span within the media composition.

Various embodiments include one or more of the following features. The graphical representation of the set of compositional metadata files forms a part of a user interface of a digital audio workstation. The multiple time-based media elements of time-based media essence include at least one of an audio dialog, music, and sound effects. The graphical representation of the set of compositional metadata files forms a part of a user interface of a non-linear video editing system. The multiple time-based media elements of time-based media essence include video. In response to a user changing time spans, the graphical representation of the set of compositional metadata files is adjusted to reflect changes in the time spans. The graphical representation of the set of files displays files in temporal order from left to right. For each file of the set of compositional metadata files, a left end of a graphical representation of the file corresponds to a start time of a time span of the media composition represented by the file and a right end of a graphical representation of the file corresponds to an end time of the time span of the media composition represented by the file. Adjusting a graphically represented boundary between a pair of files representing temporally adjacent time spans includes using a pointing device to drag the boundary left or right, wherein: dragging the boundary to the left causes content of an ending time span of a first file of the pair of files to be removed from the first file and causes the removed content to be added as a beginning time span of a second file of the pair of files; and dragging the boundary to the right causes content of a beginning time span of the second file of the pair of files to be removed and causes the removed content to be added as an ending time span of the first file of the pair of files.

In general, in another aspect, a computer program product includes: a non-transitory computer-readable medium with computer program instructions encoded thereon, wherein the computer program instructions, when processed by a computer, instruct the computer to perform a method of allocating time-based media essence among a set of media essence files that comprise a media composition, each media essence file having a corresponding compositional metadata file, the method comprising: displaying a graphical representation of the set of compositional metadata files, each compositional metadata file of the set of compositional metadata files representing multiple elements of time-based media essence corresponding to a given time span within the media composition, and wherein a temporal relationship among the time spans of the set of media essence files is reflected in a displayed spatial arrangement of the representation of the compositional metadata files; and enabling a user to interact with the displayed graphical representation of the set of compositional metadata files to: change time spans of the set of media essence files by adjusting a graphically represented boundary between a pair of compositional metadata files representing media essence files comprising media essence corresponding to temporally adjacent time spans; and change a set of elements within one or more of the media essence files by moving a graphical representation of the set of elements within a first compositional metadata file corresponding to a first time span within the media composition to a second compositional metadata file corresponding the first time span within the media composition.

DETAILED DESCRIPTION

Most media projects of any complexity involve creating various portions of the eventual composition as separate compositional metadata files. For digital audio workstations, such as Pro Tools® from Avid® Technology, Inc., of Burlington, Mass., the compositional metadata file is commonly referred to as a session. For video editing systems, such as Media Composer®, also from Avid Technology, Inc., the compositional metadata file is usually referred to as a sequence. As used herein, the term "media file" refers to any such compositional metadata file, including audio sessions and video sequences. Such media files include rich metadata that support the special editing capabilities of each of the media editing applications used to create the edited composition. Within a media file, media is represented as a number of separate media elements, commonly represented as tracks, each of which may be handled independently by the editor during the compositional process. Media essence files (distinct from the compositional metadata files) contain the actual audio or video data.

It is standard practice among media editors to break a given media composition into reels, each of which corresponds to about 20 minutes of media running time. Maintaining such a limit on a media file facilitates a reasonable response time when opening and closing files, and also enables a user to manipulate the temporal views displayed on a timeline of the user interface within manageable limits. A complete media composition is assembled by aligning the various constituent reels end to end. A given reel is defined by its temporal span. However, when a composition comprises a large number of audio, video, or data tracks, a given reel may itself be split into a number of separate media files, each of the files containing a set of one or more tracks. Each reel may include audio tracks, video tracks, or a combination of the two. The methods described herein apply equally to video and audio.

During the course of editing, material may be inserted or removed, and tracks may be added or deleted. This commonly results in the reels becoming unbalanced, with some reels becoming significantly longer than 20 minutes, and some shorter. To redress this, editors regularly need to rebalance their reels. In current workflows, this involves opening an oversized media file, selecting and cutting one or more clips from it, then closing the file and opening an undersized file, and pasting in the clips. Files may also become cumbersome because they accumulate too many tracks. To address this problem, tracks are moved by opening the recipient file and using a track import feature of a media editing application. Both of these manual processes are cumbersome, in part because current media editing applications only permit a single media file to be open at a time. Thus there is no ability to view a synopsis of an entire composition in progress.

Figure 1:
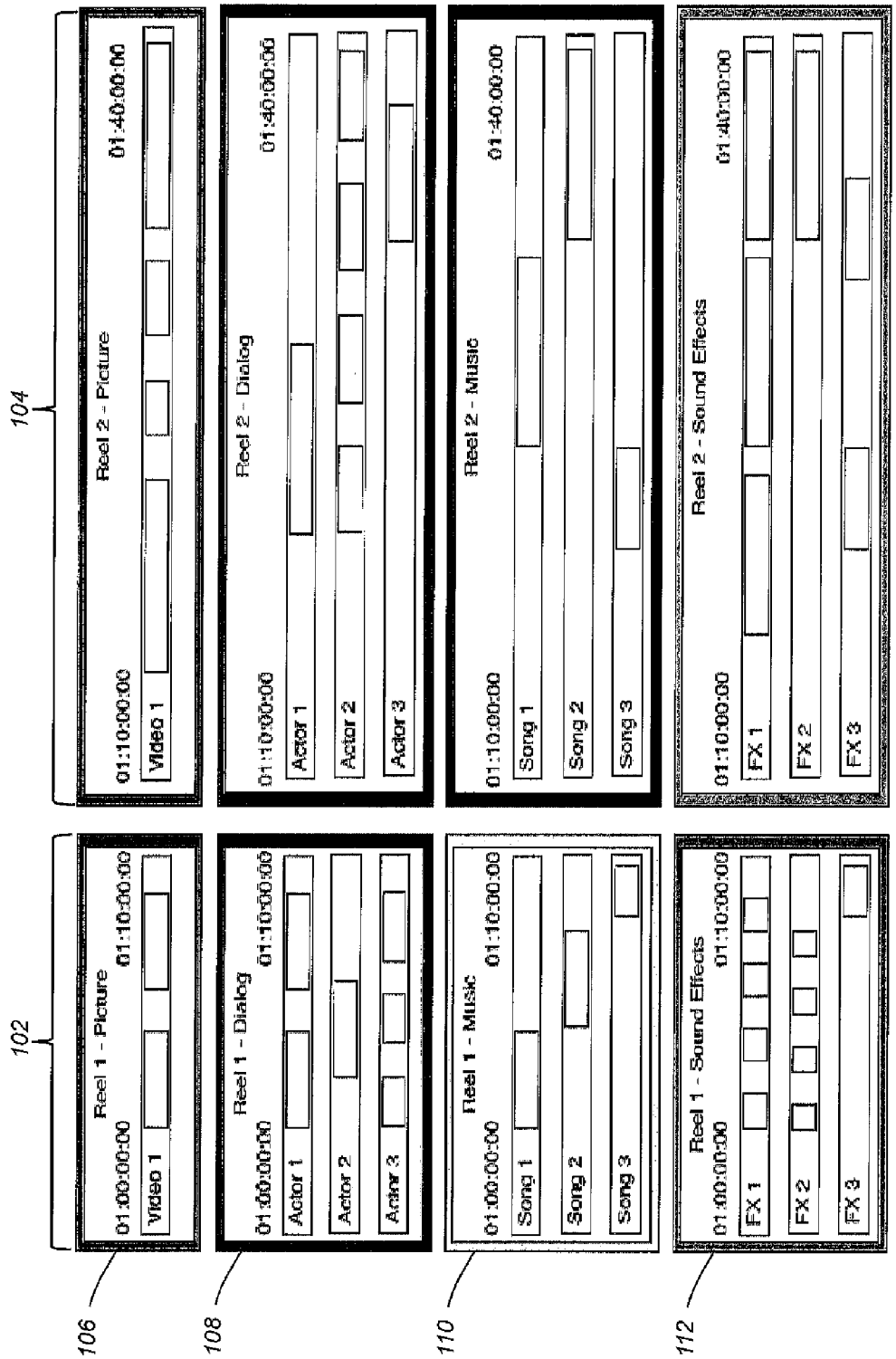
FIG. 1 is an illustration of graphical display of a super-file comprised of multiple reels, each comprising multiple media files.

In the workflow described herein, multiple sessions may be opened at once and a "super-file" representation of an entire media composition displayed. The super-file may be shown as a set of tiles laid out in two dimensions, with the temporal dimension varying from left to right, and the various sets of tracks comprising each of the reels split into different files laid out along a vertical dimension. Such a display is illustrated in FIG. 1, with two reels 102 and 104 laid out in temporal order from left to right. The various media files corresponding to a given reel are aligned in a left/right direction such that their left and right edges share common x (i.e., time) coordinates. This unified display provides views into multiple files at once, including files belonging to different reels of the composition.

Figure 2:
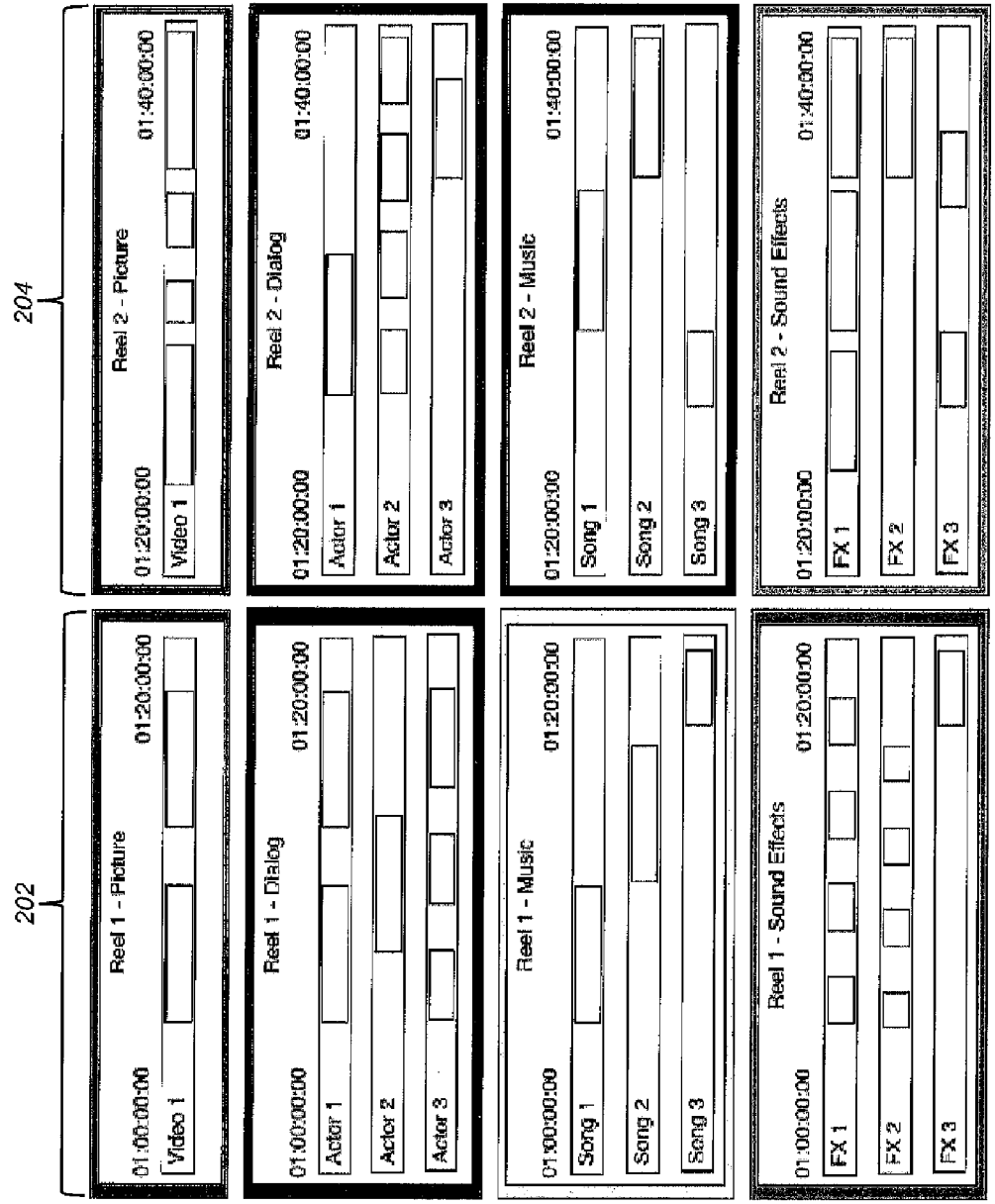
FIG. 2 is an illustration of a super-file after rebalancing of the reels illustrated in FIG. 1.

FIG. 1 illustrates a situation in which the reels correspond to different temporal lengths of the composition: 10 minutes for Reel 1 and 30 minutes for Reel 2. Each reel comprises four separate media files, the Figure showing picture (video) file 106, dialog (audio) file 108, music (audio) file 110, and sound effects (audio) file 112, all belonging to reel 102. FIG. 2 illustrates the reels after rebalancing into two 20 minute long reels 202 and 204. A user's ability to manipulate the files is mediated via a graphical user interface. Temporal rebalancing, i.e., changing the duration of two reels, may be implemented by enabling the user to move a boundary between adjacent files by clicking and dragging the boundary, or by selecting the boundary and using keyboard commands. In addition, one or more tracks may be moved from one file of a given reel to another file by moving them vertically, such as by selecting and dragging or using arrow keys on the keyboard.

Figure 3:
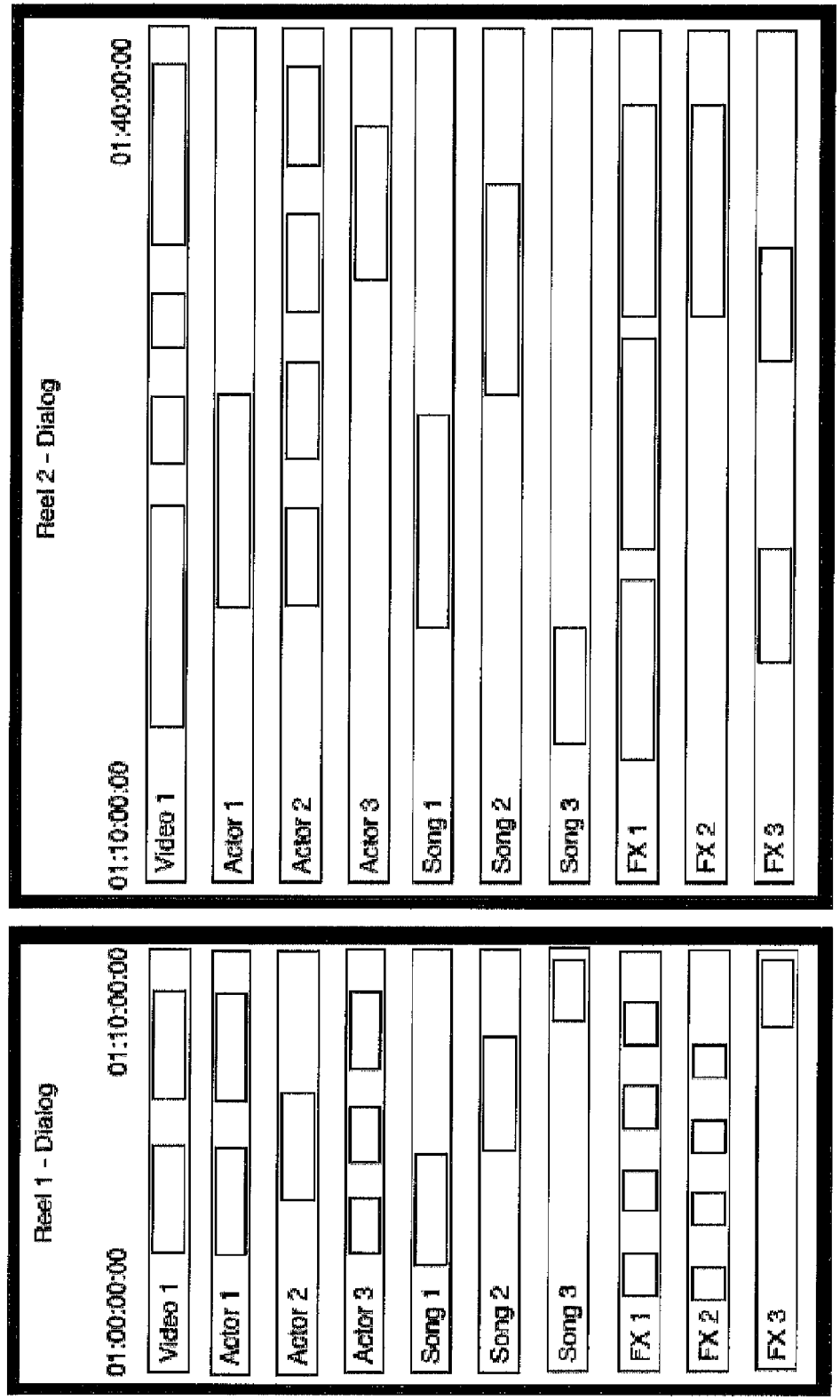
FIG. 3 is an illustration of a super-file after consolidating the multiple files of the reels illustrated in FIG. 1 into single files that include all the tracks of each reel.
Figure 4:
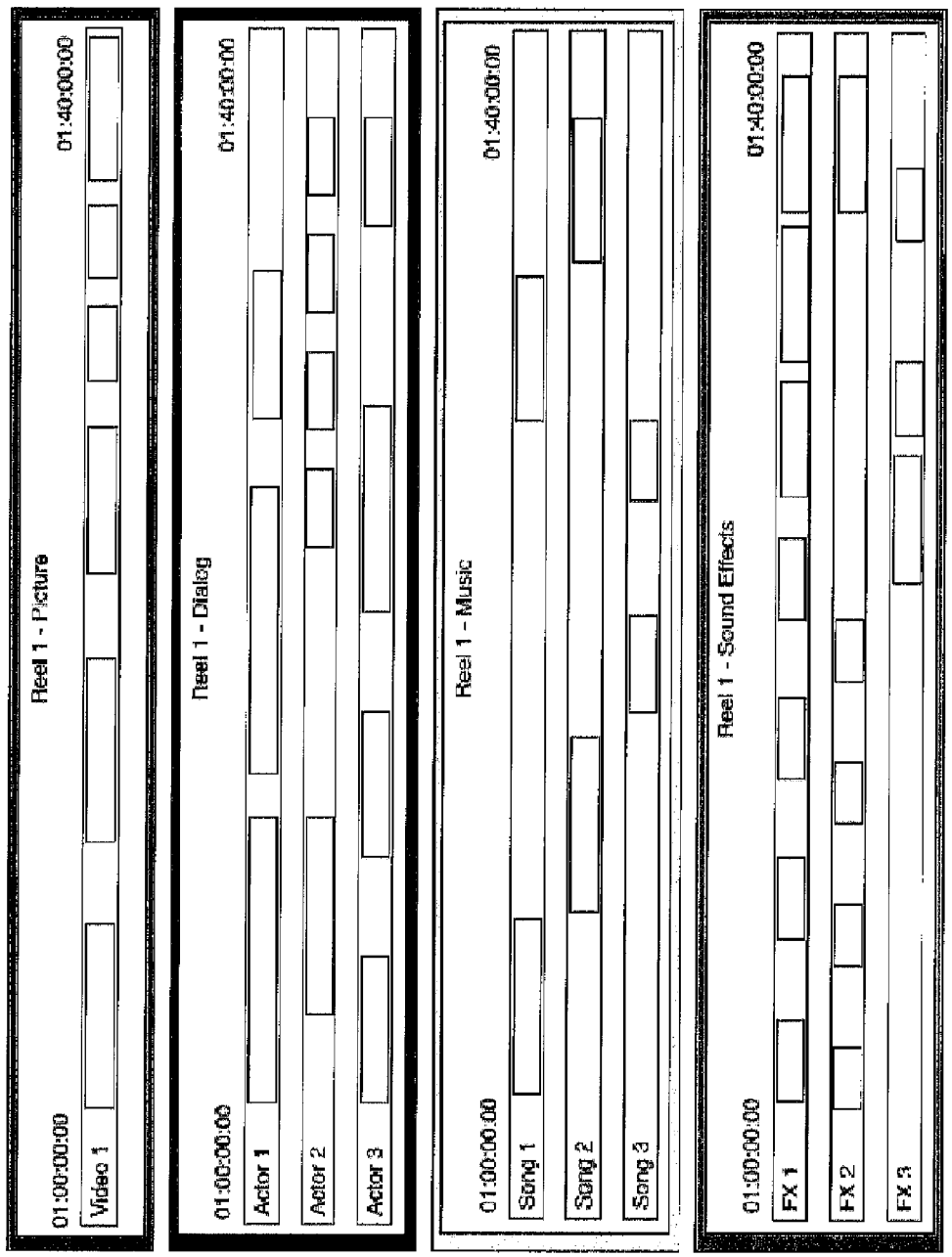
FIG. 4 is an illustration of the consolidation of the media files illustrated in FIG. 1 across corresponding files of the various reels comprising a media project.
Figure 5:
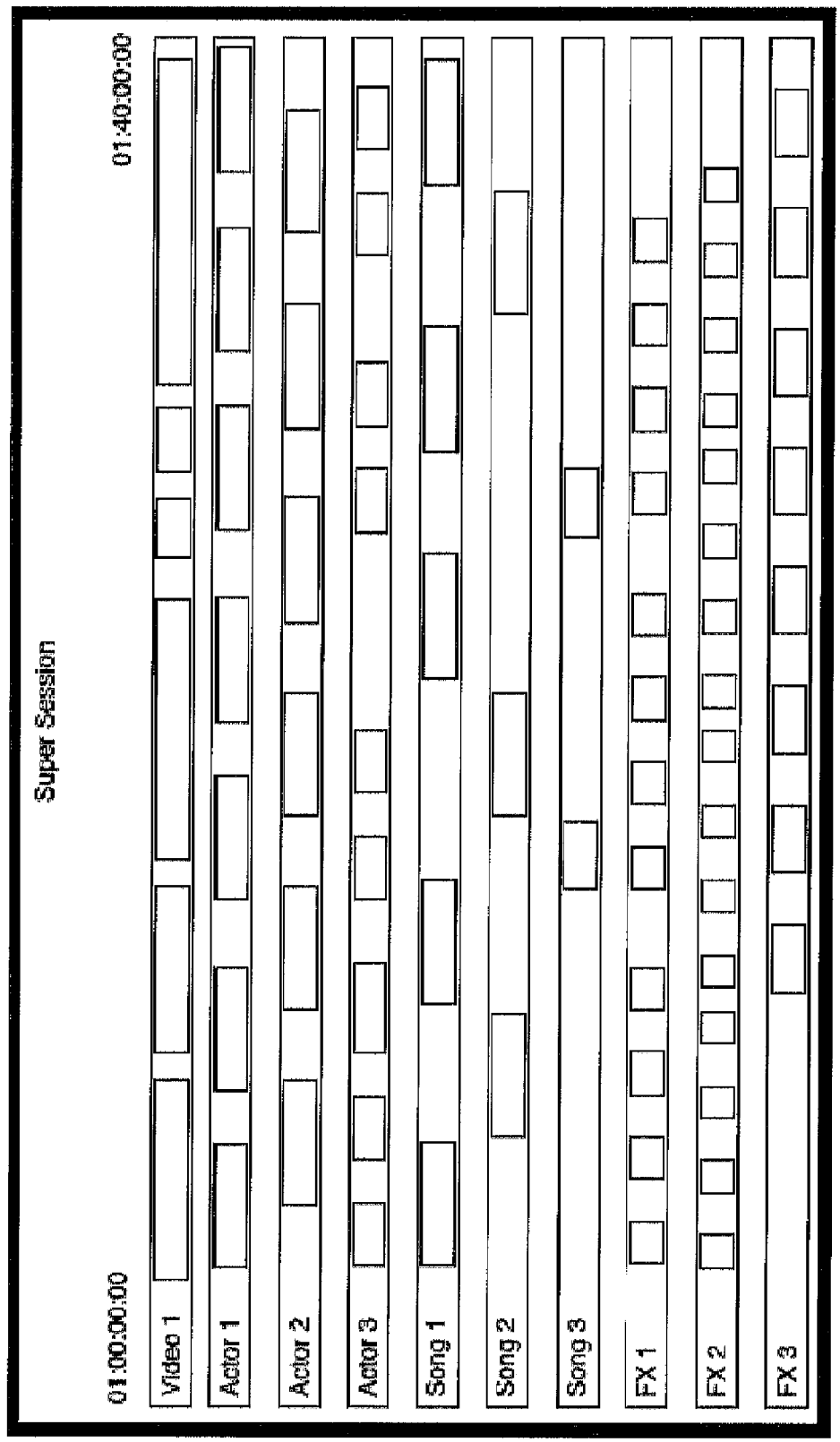
FIG. 5 is an illustration of the consolidation of files containing all tracks across all reels of a media projects into a single media file.
Figure 6:
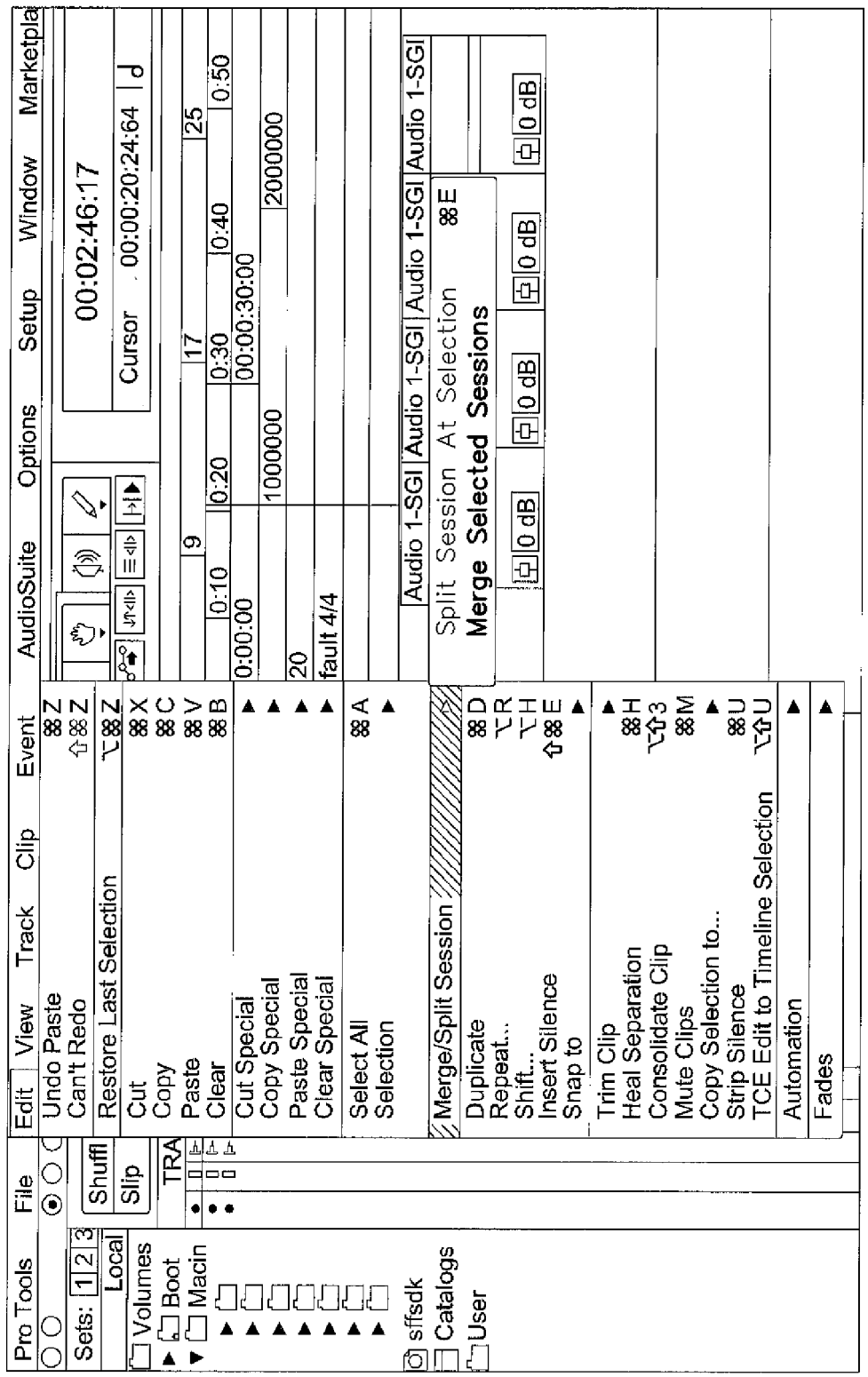
FIG. 6 is a screen shot of a digital audio workstation user interface displaying user selection of merging or splitting of selected files.

The super-file view may be used to merge files together or to split them apart into more than one file. The need for such merging or splitting arises when production moves through the phases of recording, editing, and mixing. In each phase, different users work on the media project, each having their own desired workflow. To better support individually tailored workflows, the ability to split or consolidate tracks and timespans between media files proves beneficial. For example, when all tracks of a given reel are consolidated into a single file, as illustrated in FIG. 3, a user can readily work with all tracks associated with a time span, e.g., by performing an edit across all tracks, such as a cut, paste, or movement of a clip either within a given track, or from one track to another. Consolidation across reels of files corresponding to a given set of tracks, as shown in FIG. 4, may assist workflows in which users responsible for a given track or set of tracks wish to work seamlessly across the entire duration of the media project. Complete consolidation of all tracks and reels into a single file, as illustrated in FIG. 5, enables a user to view, edit, and play all tracks across the entire timespan of the media production from end to end. Each of these consolidation actions serves to speeds up production since it reduces the number of times that a user is required to open and close different media files to access different tracks or timespans, while at the same time enabling users to control the size of media files should they become unwieldy. An illustrative user interface for mediating a command to split or merge files is shown in FIG. 6.

An arbitrary number of files may be tiled into a super-file display, with temporal spans extending along the x axis and tracks separated from each other along the y axis.

Rebalancing of files may take place automatically, triggered, for example, by files reaching a predetermined length or predetermined variance from a selected target length, e.g., 20 minutes. Such automatic rebalancing may be temporal, i.e., even out temporal durations of the reels comprising a media project, and/or track-based, i.e., move tracks between the various files of a given reel to balance tracks among the files.

In response to the user's graphical manipulation of the super-file display, the system automatically moves media and metadata from the affected media files (i.e., compositional metadata files) and media essence files to make them consistent with the updated super-session display. When timespans are manipulated, the system moves content from the file being shortened into the file being lengthened. While the user interface is highly responsive, the actual movement of the corresponding media essence may take place in the background, and does not need to keep up with the changes being made via the interface by the user.

We now provide more detail on how temporal changes and track changes may be implemented in a media file. A media file may be represented in a computer memory associated with a media editing application (e.g., a non-linear video editing application or a digital audio workstation) in a runtime data model. In the illustrative example described, the model has a starting point labeled at media sample 0 and an ending point of the media file length as set by the user, or defaulted to 10,000,000 at 44.1 KHz, for example. The runtime data model contains a list of track objects, a list of clip objects (audio or video regions or clips), and various other settings associated with the file.

Each track contains various settings and a set of "playlists." Such playlists include clip playlists, volume automation playlists, pan automation playlists, and others that store data associated with a specific media sample location on the track. Each clip or automation point is placed on the playlist at a specified media sample point. The information contained on a track is combined by a set of rules during playback (audio or video) to produce the final output of the track.

When temporal spans are moved between files, i.e., when vertical boundaries of two adjacent reels are changed, the following steps are performed. Let File 1 be the left hand file and File 2 be the right hand file. In the runtime data model of file 1, copy data from media sample 5,000,000 to 10,000,000 to a temporary memory buffer, delete data from media sample 5,000,000 to 10,000,000, and change the model's length from 10,000,000 to 5,000,000 media samples. In the runtime data model of File 2, change the length from 10,000,000 media samples to 15,000,000 media samples, move all existing temporal data from its original location to that location plus 5,000,000 media samples, and insert the data from the temporary memory buffer at media sample 0 of File 2's runtime data model. Delete the data in the temporary memory buffer, and save each of run time data models for File 1 and File 2 to a separate file.

When tracks are moved between files of a given reel, the following steps are performed. Let File 1 be the top document and File 2 be the bottom document. In File 1's runtime data model, copy the bottom N tracks to a temporary memory buffer, delete the bottom N tracks, and insert the data from the temporary memory buffer into the beginning of the list of tracks of File 2's runtime data model. Save each of run time data models for File 1 and File 2 to a separate file.

The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, various stereoscopic displays including displays requiring viewer glasses and glasses-free displays, cathode ray tubes, video projection systems and other video output devices, printers, devices for communicating over a low or high bandwidth network, including network interface devices, cable modems, and storage devices such as disk or tape. One or more input devices may be connected to the computer system. Example input devices include, but are not limited to, a keyboard, keypad, track ball, mouse, pen and tablet, touchscreen, camera, communication device, and data input devices. The invention is not limited to the particular input or output devices used in combination with the computer system or to those described herein.

The computer system may be a general purpose computer system, which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid state drives, which may include an array of local or network attached disks.

A system such as described herein may be implemented in software, hardware, firmware, or a combination of the three. The various elements of the system, either individually or in combination may be implemented as one or more computer program products in which computer program instructions are stored on a computer readable medium for execution by a computer, or transferred to a computer system via a connected local area or wide area network. Various steps of a process may be performed by a computer executing such computer program instructions. The computer system may be a multiprocessor computer system or may include multiple computers connected over a computer network. The components described herein may be separate modules of a computer program, or may be separate computer programs, which may be operable on separate computers. The data produced by these components may be stored in a memory system or transmitted between computer systems by means of various communication media such as carrier signals.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of allocating time-based media essence among a set of reels that comprise a media composition, each reel comprising a plurality of media essence files, each media essence file having a corresponding compositional metadata file that references the media essence file corresponding to the compositional metadata file, the method comprising:

displaying a graphical representation of the set of reels and of the compositional metadata files that reference media essence files within each reel of the set of reels, each reel of the set of reels including media essence files that include media essence corresponding to a temporal range within the media composition spanned by the reel, and wherein a temporal relationship among temporal ranges spanned by each reel of the set of reels is reflected in a displayed spatial arrangement of the graphical representation of the reels and of the compositional metadata files referencing the media essence files within each reel; and enabling a user to interact with the displayed graphical representation of the set of reels to change temporal ranges of the set of reels by adjusting a graphically represented boundary between a pair of reels that comprise media essence files corresponding to adjacent temporal ranges of the media composition; and automatically updating contents of each reel having an adjusted boundary to include media essence files corresponding to their respective adjusted temporal ranges and updating the graphical representation to display media metadata files within reels having adjusted temporal ranges.

2. The method of claim 1, wherein the graphical representation of the set of reels and of the compositional metadata files forms a part of a user interface of a digital audio workstation.

3. The method of claim 2, wherein the time-based media essence files include media essence representing at least one of audio dialog, music, and sound effects.

4. The method of claim 1, wherein the graphical representation of the set of reels and of the compositional metadata files forms a part of a user interface of a non-linear video editing system.

5. The method of claim 4, wherein the time-based media essence files include media essence representing video.

6. The method of claim 1, wherein the graphical representation of the set of reels and of the compositional metadata files displays compositional metadata data files referencing media essence files in temporal order from left to right.

7. The method of claim 6, wherein, for each compositional metadata file, a left end and a right end of a graphical representation of the compositional metadata file corresponds to a start time and an end time respectively of a time span of the media essence referenced by the compositional metadata file.

8. The method of claim 1, wherein adjusting a graphically represented boundary between a pair of reels representing temporally adjacent time spans includes using a pointing device to drag the boundary left or right, wherein:

dragging the boundary to the left causes content of an ending time span of a first reel of the pair of reels to be removed from the first reel and causes the removed content to be added as a beginning time span of a second reel of the pair of reels; and dragging the boundary to the right causes content of a beginning time span of the second file of the pair of reels to be removed and causes the removed content to be added as an ending time span of the first reel of the pair of reels.

9. A computer program product comprising:

a non-transitory computer-readable medium with computer program instructions encoded thereon, wherein the computer program instructions, when processed by a computer, instruct the computer to perform a method of allocating time-based media essence among a set reels that comprise a media composition, each reel comprising a plurality of media essence files, each media essence file having a corresponding compositional metadata file that references its corresponding media essence file, the method comprising:

displaying a graphical representation of the set of reels and of the compositional metadata files that reference media essence files within each reel of the set of reels, each reel of the set of reels including media essence files that include, media essence corresponding to a temporal range within the media composition spanned by the reel, and wherein a temporal relationship among temporal ranges spanned by each reel of the set of reels is reflected in a displayed spatial arrangement of the graphical representation of the reels and of the compositional metadata files corresponding to the media essence files within each reel; and enabling a user to interact with the displayed graphical representation of the set of reels to change temporal ranges of the set of reels by adjusting a graphically represented boundary between a pair of reels that comprise media essence files corresponding to adjacent temporal ranges of the media composition; and automatically updating contents of each reel having an adjusted boundary to include media essence files corresponding to their respective adjusted temporal ranges and updating the graphical representation to display media metadata files within reels having adjusted temporal ranges.

* * * * *